(12) United States Patent
Konik et al.

(10) Patent No.: US 10,372,578 B2
(45) Date of Patent: Aug. 6, 2019

(54) DYNAMICALLY ADJUSTING STATISTICS COLLECTION TIME IN A DATABASE MANAGEMENT SYSTEM

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 14/672,858

(22) Filed: Mar. 30, 2015

(65) Prior Publication Data

US 2016/0292190 A1    Oct. 6, 2016

(51) Int. Cl.
| | |
|---|---|
| G06F 16/00 | (2019.01) |
| G06F 11/30 | (2006.01) |
| G06F 16/21 | (2019.01) |
| G06F 16/23 | (2019.01) |
| G06F 11/34 | (2006.01) |
| G06F 16/2453 | (2019.01) |

(52) U.S. Cl.
CPC ........ *G06F 11/302* (2013.01); *G06F 11/3409* (2013.01); *G06F 11/3452* (2013.01); *G06F 16/217* (2019.01); *G06F 16/2379* (2019.01); *G06F 16/24545* (2019.01)

(58) Field of Classification Search
CPC ............ G06F 11/302; G06F 17/30469; G06F 11/3409; G06F 17/30306; G06F 11/3452; G06F 17/30377; G06F 16/24545; G06F 16/2379; G06F 16/217
See application file for complete search history.

(56) References Cited

U.S. PATENT DOCUMENTS

| | | | |
|---|---|---|---|
| 6,553,369 | B1 | 4/2003 | Guay et al. |
| 7,739,293 | B2 | 6/2010 | Lightstone et al. |
| 8,046,354 | B2 | 10/2011 | Day et al. |
| 8,135,702 | B2 | 3/2012 | Burger et al. |
| 8,176,088 | B2 | 5/2012 | Rjaibi et al. |
| 8,447,743 | B2 | 5/2013 | Santosuosso |
| 8,812,481 | B2 | 8/2014 | Zuzarte et al. |

OTHER PUBLICATIONS

Konik et al., "Dynamically Adjusting Statistics Collection Time in a Database Management System," U.S. Appl. No. 14/750,074, filed Jun. 25, 2015.
List of IBM Patents and Patent Applications Treated as Related.

*Primary Examiner* — Paul Kim
(74) *Attorney, Agent, or Firm* — Nolan M. Lawrence

(57) ABSTRACT

Each of one or more commit cycles may be associated with a predicted number of updates. A statistics collection time for a database table can be determined by estimating a sum of predicted updates included in one or more commit cycles. Whether the estimated sum of predicted updates is greater than a first threshold may be determined. In addition, a progress point for a first one of the commit cycles can be determined. A time to collect statistics may be selected based on the progress point of the first commit cycle.

16 Claims, 5 Drawing Sheets

DYNAMICALLY ADJUSTING STATISTICS COLLECTION TIME IN A DATABASE MANAGEMENT SYSTEM

BACKGROUND

This disclosure relates generally to database management systems, and more specifically, to adjusting the time that a statistics collection component of a database management system updates database statistics.

A relational database organizes data in two dimensions, i.e., as tables having rows and columns. A relational database is typically used in an enterprise to store large quantities of transactional data. User programs can be used to access a database. An access may read or write data to the database. In addition, an access may include searching for particular data. Structured Query Language (SQL) is a language that may be used to access data stored in a relational database.

Many database management systems (DBMS) include a query optimizer and a statistics collection component to collect various statistics for data tables. Some example statistics include the number of rows in a table, the number of distinct values in a column (cardinality), the most frequent values in a column, and the distribution of data values. The query optimizer uses table statistics to generate and select an access plan for executing a particular query. The query optimizer may select a "best" plan from several alternative plans, e.g., a plan that is fastest, uses fewest resources, and the like.

SUMMARY

Various embodiments are directed to a computer-implemented method for determining a statistics collection time for a database table. The method may include estimating a sum of predicted updates included in one or more commit cycles. Each of the commit cycles is associated with a predicted number of updates. In addition, it may be determined whether the estimated sum of predicted updates is greater than a first threshold. The method may also include determining a progress point for a first one of the commit cycles and selecting a time to collect statistics based on the progress point of the first commit cycle.

In addition, various embodiments are directed to a system and a computer program product for determining a statistics collection time for a database table.

The above summary is not intended to describe each illustrated embodiment or every implementation of the present disclosure.

BRIEF DESCRIPTION OF THE DRAWINGS

In the Figures and the Detailed Description, like numbers refer to like elements.

Figure 1:
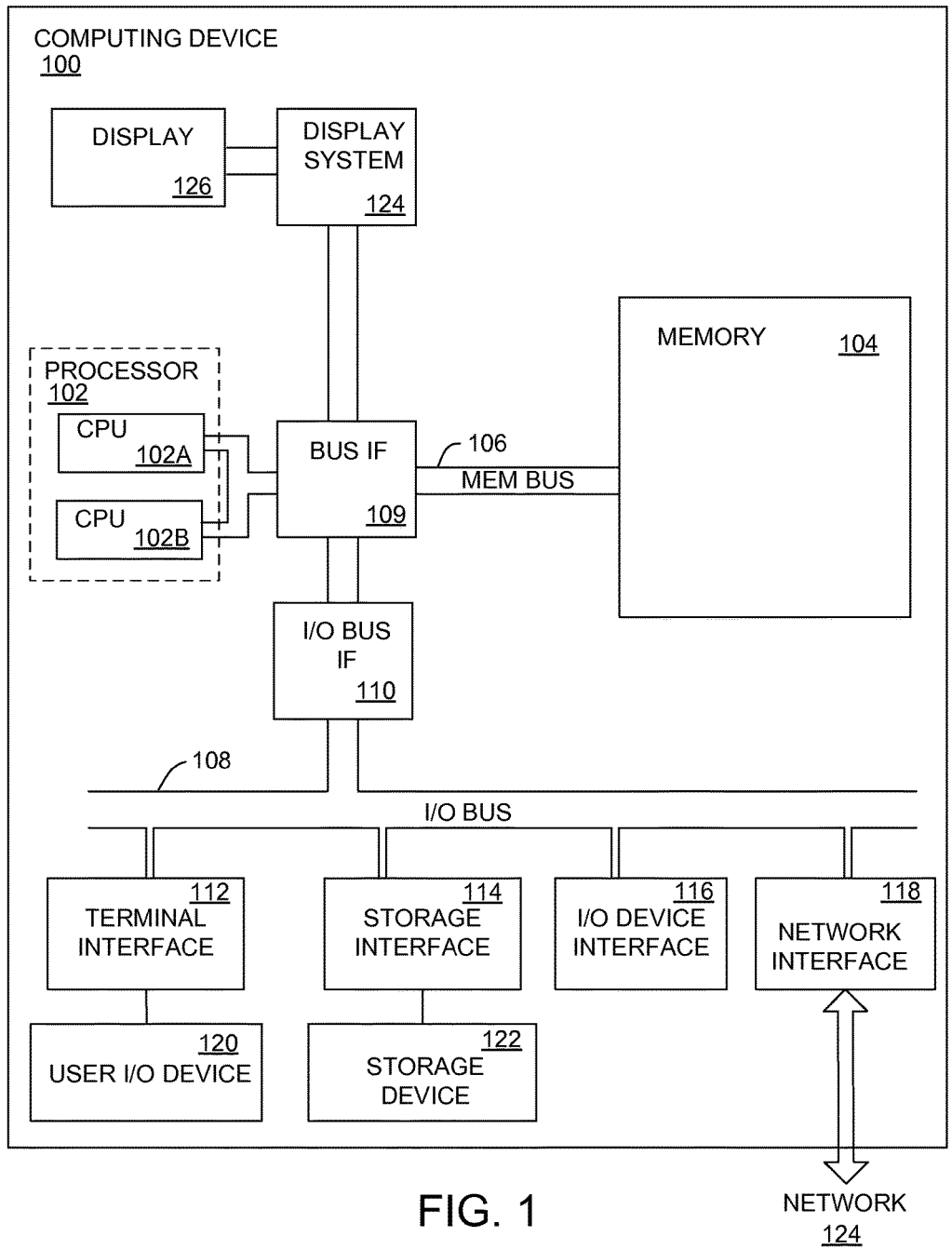
FIG. 1 is a block diagram of a computing device in which various embodiments may be implemented.

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database management systems, and more specifically, to adjusting the time that a statistics collection component of a DBMS updates database statistics. While the present disclosure is not necessarily limited to such applications, various aspects of the disclosure may be appreciated through a discussion of various examples using this context.

In a DBMS, a query optimizer uses statistics collected by a statistics collection component to generate and select an access plan for executing a query. Generally, it is important that the statistics provided to the query optimizer be accurate. If an access plan is selected based on stale or outdated statistics, then some access plan other than the "best" access plan may be selected. In comparison with the best plan, an access plan that is not the best may require longer processing time or use more resources. Statistics may become inaccurate or stale as a result of changes that are made to the underlying data after the statistics are collected.

When a statistics collection component in a DBMS operates, it consumes system resources. Collecting statistics can require scanning and sorting all of the data in a table. Collecting statistics can be resource intensive, especially for large tables. When a statistics collection component is operating, user programs and batch jobs may need to share access to a database table with the component.

User programs can be used to read or write data to a database. User programs often perform reads and writes in a series of steps that may be referred to as a transaction. A transaction is a logical unit of work that may include a "commit cycle." During the first phase of a commit cycle, a user program modifies data stored in a database table. These modifications may be tracked using database logs and can be "rolled back" so long as the commit cycle has not completed. In other words, the modifications have only a "temporary" character during the first phase of a commit cycle. If the transaction fails at some point during the first phase of the commit cycle, all of the changes made during the first phase need to be undone. Rolling back is a process that backs out changes made by a failed transaction. In the second phase, the modifications to database are "committed" or rolled back. In the second phase, the modified data becomes "permanent" once it has been committed. Once modifications are committed, they can no longer be rolled back.

A user program may include one or several large transactions with thousands or even millions of database updates. This is especially true for some batch jobs. At the end of the first phase of the commit cycle for a user program, the program or batch job may issue a commit command. However, if something goes wrong during the first phase, perhaps near the end of the first phase (after thousands or millions of rows have been modified), the program or batch job issues a roll back command.

A statistics collection component may be configured to determine when statics are stale and to update statistics when it determines that statics have become stale. The statistics collection component may monitor the number of modifications recorded in a database log to determine when statics are stale. A statistics collection component may determine that statics are stale during a first phase of a commit cycle involving a large number of updates. As a result, the statistics collection component may collect updated statistics during the first phase of the large job. There may be problems, however, if the updates are rolled back in the second phase of the commit cycle. The roll back makes the updated statistics collected in phase one inaccurate. In addition, the pre-update statistics remain stale and the statistics collection component needs to repeat the process of collecting statistics. This wastes system resources. In addition, query plans may perform poorly until the statistics can be refreshed.

According to various embodiments, a statistics collection component determines a time for collecting statistics for a database table. In some embodiments, as further described below, a commit cycle may be predicted to have a large number of updates. If it is determined that a particular commit cycle, e.g., one that is predicted to have a large number of updates, has not yet started, a statistics collection time can be set at an immediate time. In various embodiments, statistics collection can be set to start immediately, even if the typical statistics collection time might have been scheduled for a later time. If a commit cycle predicted to have a large number of updates is predicted to complete soon, a statistics collection time can be set to a future time when the commit cycle has completed. If a commit cycle predicted to have a large number of updates is determined to be in the "middle" of its life cycle, a statistics collection time can be set to a future time or statistics can be collected at an immediate time using sampling if there is a relatively "urgent" need for updated statistics.

In various embodiments, a method for determining a time for collecting statistics can include estimating a sum of predicted updates included in one or more commit cycles. In addition, the method may include determining whether the estimated sum of predicted updates is greater than a first threshold, determining a progress point for a first one of the commit cycles, and selecting a time to collect statistics based on the progress point of the first commit cycle.

FIG. 1 is a block diagram of a computing device 100 according to various embodiments. The computing device 100 is one example of a context in which embodiments may be implemented. The mechanisms and apparatus of the various embodiments disclosed herein apply equally to any appropriate computing device. The major components of the computing device 100 include one or more processors 102, a memory 104, a terminal interface 112, a storage interface 114, an Input/Output ("I/O") device interface 116, and a network interface 118, all of which are communicatively coupled, directly or indirectly, for inter-component communication via a memory bus 106, an I/O bus 108, bus interface unit ("IF") 109, and an I/O bus interface unit 110.

The computing device 100 may contain one or more general-purpose programmable central processing units (CPUs) 102A and 102B, herein generically referred to as the processor 102. In an embodiment, the computing device 100 may contain multiple processors; however, in another embodiment, the computing device 100 may alternatively be a single CPU device. Each processor 102 executes instructions stored in the memory 104 and may include one or more levels of on-board cache.

In an embodiment, the memory 104 may include a random-access semiconductor memory, storage device, or storage medium (either volatile or non-volatile) for storing or encoding data and programs. In another embodiment, the memory 104 represents the entire virtual memory of the computing device 100, and may also include the virtual memory of other computer systems coupled to the computing device 100 or connected via a network 124. The memory 104 is conceptually a single monolithic entity, but in other embodiments the memory 104 is a more complex arrangement, such as a hierarchy of caches and other memory devices. For example, memory 104 may exist in multiple levels of caches, and these caches may be further divided by function, so that one cache holds instructions while another holds non-instruction data, which is used by the processor or processors. Memory 104 may be further distributed and associated with different CPUs or sets of CPUs, as is known in any of various so-called non-uniform memory access (NUMA) computer architectures.

Figure 2:
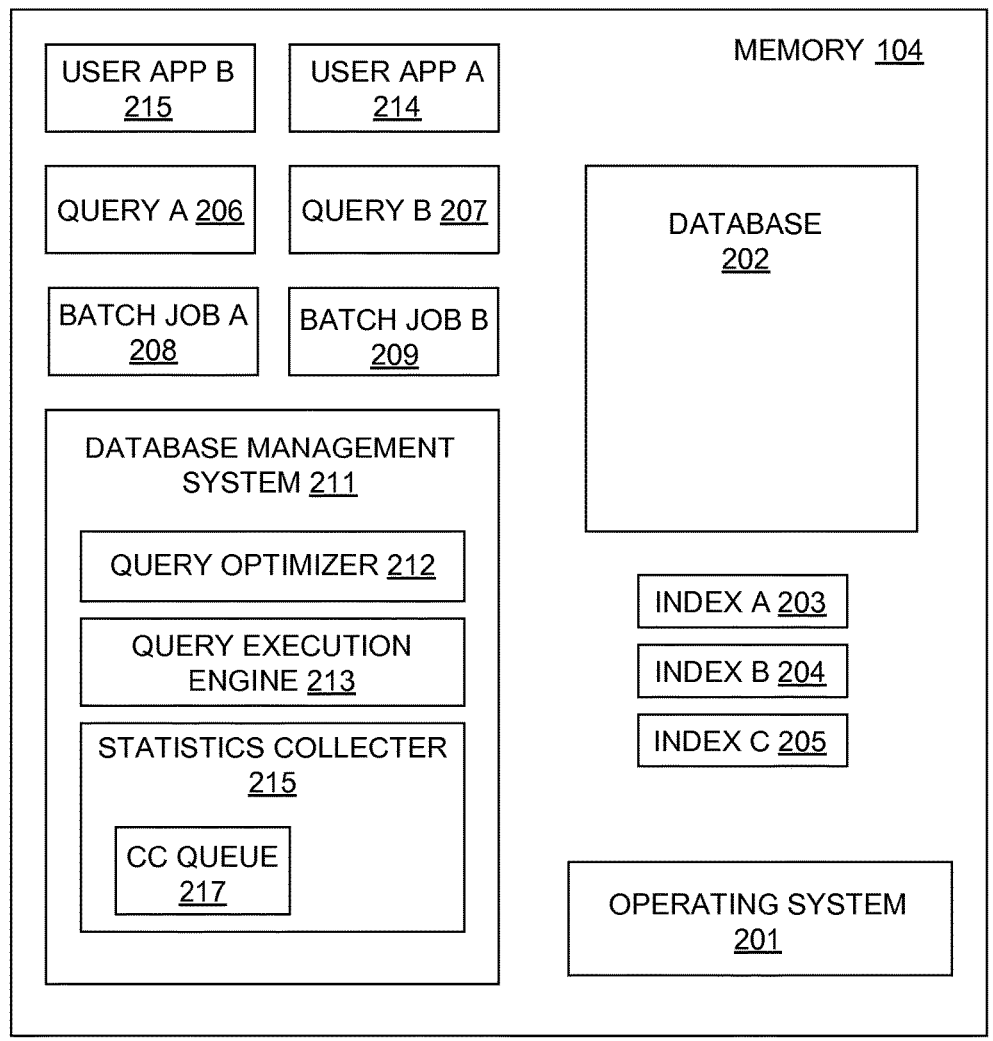
FIG. 2 is a conceptual illustration of the major software components of the computing device of FIG. 1 according to various embodiments.

The memory 104 may store all or a portion of the software components and data shown in FIG. 2. These programs and data structures are illustrated in FIG. 2 as being included within the memory 104 in the computing device 100, however, in other embodiments, some or all of them may be on different computer systems and may be accessed remotely, e.g., via a network 124. The computing device 100 may use virtual addressing mechanisms that allow the programs of the computing device 100 to behave as if they only have access to a large, single storage entity instead of access to multiple, smaller storage entities. Thus, while the components and data shown in FIG. 2 are illustrated as being included within the memory 104, these components and data are not necessarily all completely contained in the same storage device at the same time. Further, although the components and data shown in FIG. 2 are illustrated as being separate entities, in other embodiments some of them, portions of some of them, or all of them may be packaged together.

In an embodiment, the components and data shown in FIG. 2 may include instructions or statements that execute on the processor 102 or instructions or statements that are interpreted by instructions or statements that execute on the processor 102 to carry out the functions as further described below. In another embodiment, the components shown in FIG. 2 may be implemented in hardware via semiconductor devices, chips, logical gates, circuits, circuit cards, and/or other physical hardware devices in lieu of, or in addition to, a processor-based system. In an embodiment, the components shown in FIG. 1 may include data in addition to instructions or statements.

The computing device 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In an embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computing device 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computing device 100 to other digital devices and computer systems; these communication paths may include, e.g., one or more networks 124.

Although the computing device 100 shown in FIG. 1 illustrates a particular bus structure providing a direct communication path among the processors 102, the memory 104, the bus interface 109, the display system 124, and the I/O bus interface unit 110, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computing device 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

FIGS. 1 and 2 are intended to depict the representative major components of the computing device 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 2 may be implemented, in various embodiments, in a number of different manners, including using various computer applications, routines, components, programs, objects, modules, data structures, etc., which may be referred to herein as "software," "computer programs," or simply "programs."

FIG. 2 is a conceptual illustration of the major software components of computing device 100 in memory 104. Operating system 201 provides various low-level software functions, such as device interfaces, management of memory pages, management and dispatching of multiple tasks, etc. as is well-known in the art. A structured database 202 contains data which is maintained by computing device 100 and for which the computing device provides access to one or more users, who may be directly attached to computing device 100 or may be remote clients who access computing device 100 through a network using a client/server access protocol. In some embodiments, database 202 is a relational database. In other embodiments, database 202 may be any other known type of database, such as key-value data store. Database 202 contains one or more tables, each having a plurality of records, each record containing at least one (and usually many) fields, as is well known in the art. Database 202 might contain almost any type of data which is provided to users by a computer system. Associated with database 202 are multiple database indexes 203-205, each index representing an ordering of records in database 202 according to some specified criterion. Although only one database 202 and three indexes 203-205 are shown in FIG. 2, the computing device may contain multiple databases, and the number of indexes may vary (and typically is much larger). Alternatively, database 202 on computing device 100 may be logically part of a larger distributed database which is stored on multiple computer systems.

Database management system 211 provides basic functions for the management of database 202. Database management system 211 may theoretically support an arbitrary number of databases, although only one is shown in FIG. 2. Database management system 211 preferably allows users to perform basic database operations, such as defining a database, altering the definition of the database, creating, editing and removing records in the database, viewing records in the database, defining database indexes, and so forth. Among the functions supported by database management system 211 is the making of queries against data in database 202. Query support functions in database management system 211 include query optimizer 212, query execution engine 213, and statistics collection component (statistics collector) 215. The statistics collection component may include logic and a commit cycle ("CC") queue 217, further described below. In various embodiments, the CC queue need not be a queue, but may be any suitable type of data structure.

Database management system 211 may further contain any of various more advanced database functions. Although database management system 211 is represented in FIG. 2 as an entity separate from operating system 201, it will be understood that in some computer architectures various database management functions are integrated with the operating system.

Query optimizer 212 generates query execution strategies for performing database queries. The amount of time or resource required to perform a complex query on a large database can vary greatly, depending on various factors, such as the availability of an index, the amount of resources required to evaluate each condition, and the expected selectivity (i.e., number of records eliminated from consideration) of the various logical conditions. Query optimizer 212 determines an "optimal" execution strategy according to any optimizing algorithm, now known or hereafter developed, and generates an execution strategy, also known as an "access plan" or "query plan," according to the determination. The query optimizer 212 receives various statistics for data tables from the statistics collection component 215. Some example statistics include the number of rows in a table, the number of distinct values in a column (cardinality), the most frequent values in a column, and the distribution of data values. The query optimizer 212 uses table statistics to generate and select an access plan for executing a particular query.

A query can be saved as a persistent storage object in memory, and can be written to disk or other storage. Once created by query optimizer 212, a query execution strategy can be saved with the query as part of the persistent storage object. For a given query, it is possible to generate and save one or multiple optimized execution strategies. The query can be invoked, and a saved query strategy re-used (re-executed), many times.

FIG. 2 represents persistent storage objects Query A 206 and Query B 207. Although two query objects, each containing two execution strategies, are represented for illustrative purposes in FIG. 2, it will be understood that the actual number of such entities may vary, that typically a large computer system contains a much larger number of query objects, that each query object may contain or be associated with zero, one, two, or more than two execution strategies. Although these are referred to herein as "query objects", the use of the term "object" is not meant to imply that database management system 211 or other components are necessarily programmed using so-called object-oriented programming techniques, or that the query object necessarily has the attributes of an object in an object-oriented programming environment, although it would be possible to implement them using object-oriented programming constructs.

In addition to database management system 211, one or more user applications 214, 215 and one or more batch jobs 208, 209 executing on CPU 101 may access data in database 202 to perform tasks on behalf of one or more users. Such user applications may include, e.g., personnel records, accounting, code development and compilation, mail, calendaring, or any of thousands of user applications. Some of these applications may access database data in a read-only manner, while others have the ability to update data. There may be many different types of read or write database access tasks, each accessing different data or requesting different operations on the data. For example, one task may access data from a specific, known record, and optionally update it, while another task may invoke a query, in which all records in the database are matched to some specified search criteria, data from the matched records being returned, and optionally updated. Furthermore, data may be read from or written to database 202 directly, or may require manipulation or combination with other data supplied by a user, obtained from another database, or some other source. In yet another example, hundreds of thousands or millions of pending financial transactions may be collected in one or more transaction files throughout the day. At the end of the business day, the pending transactions may be posted to customer accounts maintained in a database as a large batch job. A batch job may read and write data to database 202. Although two applications 214, 215 are shown for illustrative purposes in FIG. 2, the number of such applications may vary. Applications 214, 215 typically utilize function calls to database manager 211 to access data in database 202, and in particular, to execute queries to data in the database, although in some systems it may be possible to independently access data in database 202 directly from the application.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex database server environment, the number and complexity of such entities is typically much larger. Additionally, although software components are depicted in FIG. 2 as residing on the single computing device 100 for completeness of the representation, it is not necessarily true that all programs, functions and data will be present on a single computer computing device or will be performed on a single computer computing device. For example, user applications may be on a separate system from the database; a database may be distributed among multiple computer systems, so that queries against the database are transmitted to remote systems for resolution, and so forth.

While the software components of FIG. 2 are shown conceptually as residing in memory 104, it will be understood that in general the memory of a computer system will be too small to hold all programs and data simultaneously, and that information is typically stored in one or more data storage devices 122, comprising one or more mass storage devices such as rotating magnetic disk drives, and that the information is paged into memory by the operating system as required. In particular, database 202 is typically much too large to be loaded into memory, and typically only a small portion of the total number of database records is loaded into memory at any one time. The full database 202 is typically recorded in disk storage. Furthermore, it will be understood that the conceptual representation of FIG. 2 is not meant to imply any particular memory organizational model, and that computing device 100 might employ a single address space virtual memory, or might employ multiple virtual address spaces which overlap.

Figure 3:
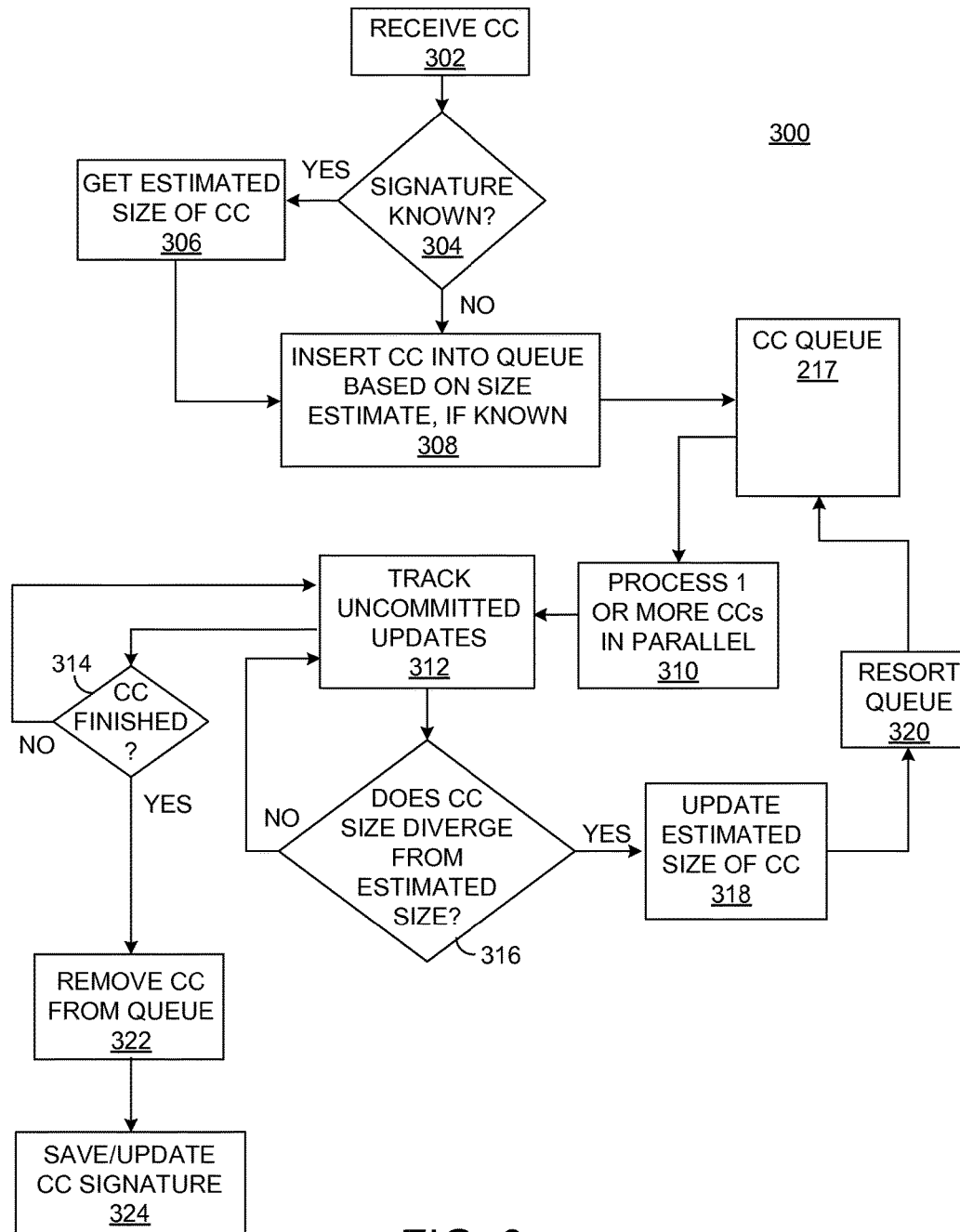
FIG. 3 is a flowchart of a process for monitoring a commit cycle during its life time and maintaining a commit cycle queue according to various embodiments.

FIG. 3 is a flowchart of a process 300 for monitoring a commit cycle during its life time and maintaining a commit cycle queue 217 according to various embodiments. As a preliminary matter, it should be noted that each commit cycle may have a unique identifier and a particular commit cycle may be executed once or multiple times. In addition, the commit cycle queue 217 created and updated in process 300 is used by a process 400 described below in FIGS. 4A, 4B. In operation 302, a commit cycle for a particular database table is received. It is determined in operation 304 whether a signature for the received commit cycle is known, i.e., whether an existing signature is associated with the commit cycle. A "signature" for a commit cycle may include the number of database updates processed during a previous execution of the commit cycle, as well as other information, such as the time or resources used by the commit cycle and whether the commit cycle was rolled back. The signature may be based on the program or function name and/or offsets therein, and/or a portion of the program stack, or particular start/end offsets of a transaction in a particular program. In general, the signature uniquely identifies the CC of interest. The signature may be used as a key or offset to metadata for the CC. In the CC metadata, there will be more particular data such as the size (number of updates), average size (average number of updates), or weighted average size (weighted average number of updates), high/low size, number of resources used, and other similar metrics. Metadata may also include highest, lowest, and other similar sizes of past executions of the CC. It is through its associated signature that a commit cycle is associated with a predicted number of updates or, more generally, a predicted amount of resource usage. In cases where other information is included in the signature, the signature for a commit cycle may combine the other information from previous executions. For example, the signature for a commit cycle may include an average number of database updates or the percentage of times that the commit cycle was rolled back in previous executions. To simplify the following discussion, it may be assumed that the signature only includes the number of updates or the average number of updates. However, it should be understood that in various embodiments the signature may be a score that combines a number or average number of updates with other information, such as processing time or resources used, and/or the likelihood or probability of a roll back. The probability of a roll back may be based on the number of times previous executions of the commit cycle have been rolled back or the number of times previous executions of the commit cycle have been committed.

If a signature is determined to be known, it is obtained in operation 306 and the process 300 proceeds to operation 308. For example, a signature may be read from a data structure in a memory. If a signature is determined to be unknown, the process 300 proceeds directly to operation 308. A signature may be unknown, for example, when it is the first time the particular commit cycle is executed. When the signature for a commit cycle is unknown, a default signature may be associated with the commit cycle. When a default signature is associated with a commit cycle, a predicted number of updates is implicitly associated with the commit cycle. In operation 308, the commit cycle is inserted into commit cycle queue 217. If the signature is known, the commit cycle is placed in the queue based on its size (or score). (As used herein, the "size" of a CC is the number of database changes associated with the CC.) For example, the commit cycle queue may arrange active commit cycles by size. If the current commit cycle is larger than any other commit cycle, it is placed in the commit queue 217 at the beginning (or end) of the list. In cases where the signature of the commit cycle is not known, it may be placed in a position in commit cycle queue 217 based on a policy and/or its default signature. For example, a commit cycle with a default signature may be placed at the beginning, end, or middle of the queue based on a predicted number of updates in the default signature.

In operation 310, one or more commit cycles are processed in parallel according to known methods. As commit cycles are processed, the number of uncommitted updates are tracked or monitored in operation 312. Uncommitted updates are updates occurring in the first phase of a commit cycle. The tracking or monitoring of updates may include determining whether the number of updates diverges from the number of updates estimated or predicted by the signature for the commit cycle. The tracking or monitoring of updates may also include determining whether the commit cycle has not yet started and whether the commit cycle has completed. In operation 316, it is determined whether the size, i.e., number of updates, of the commit cycle is greater or smaller than the estimated number of updates. If the number of updates diverges from the number estimated or predicted by the signature, the process moves to operation 318 in which an updated estimate of the size of the commit cycle is made. For example, the signature for a particular commit cycle may predict 1,000 updates. Monitoring, however, detects 2,000 pending updates. The estimate of the size of the commit cycle may be updated to the current number of pending updates, i.e., 2,000. If the number of pending updates for the particular commit cycle continues to increase, the estimated size of the commit cycle may be updated multiple times. In various embodiments, operation 316 may determine whether the size of the commit cycle is larger or smaller than estimated or predicted.

In operation 320, the commit cycle queue 217 is re-sorted. As mentioned, the commit cycle queue 217 is used by a process 400 described below in FIGS. 4A, 4B. Active commit cycles and commit cycles scheduled to be active are arranged by size in the commit cycle queue 217 so that the process 400 may operate on large commit cycles before small commit cycles. A commit cycle that is active is one that is currently executing. A commit cycle scheduled to be active is one that is just about to start executing. In other words, it is a commit cycle that will begin executing in the near future. For example, assume the commit cycle queue 217 holds 100 commit cycles. In addition, assume that the signature for one of these commit cycles includes a prediction of one million updates. Further assume that the signatures of the remaining 99 commit cycles predict that each holds 10 updates. Sorting the commit cycle queue 217 causes the process 400 to address the large commit cycle having one million updates before the remaining 99 commit cycles. Continuing the example, assume that during the processing of the 99 commit cycles predicted to hold 10 updates, monitoring in operation 316 determines that the size of one of the commit cycle diverges from the estimate. Assume that operation 316 determines that this commit cycle has 10,000 pending updates, instead of the estimated 10. Resorting the commit cycle queue in operation 320 allows the process 400 to operate on this large commit cycle before commit cycles predicted to have a smaller number of updates.

In operation 314, it is determined whether the commit cycle has ended. In other words, it is determined whether the commit cycle has either committed or rolled back its pending updates. In operation 322, the commit cycle is removed from the queue. In operation 324, a signature may be determined and either saved or updated for the commit cycle instance. A signature may be determined or updated based on an actual number of updates or resources used during execution.

Figure 4A:
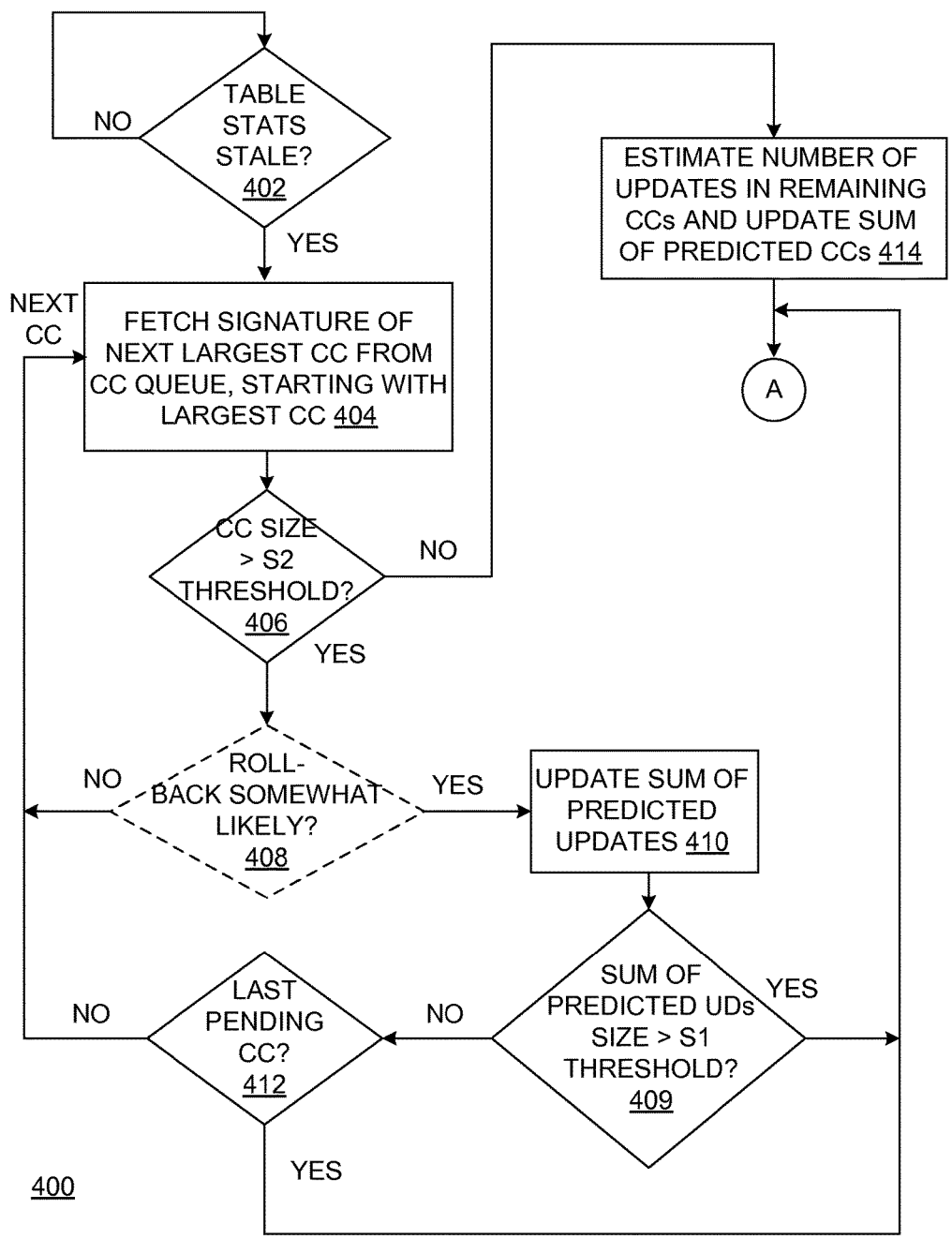
FIGS. 4A and 4B depict a flowchart of process 400 for dynamically determining a statistics collection time for a database table according to various embodiments.
Figure 4B:
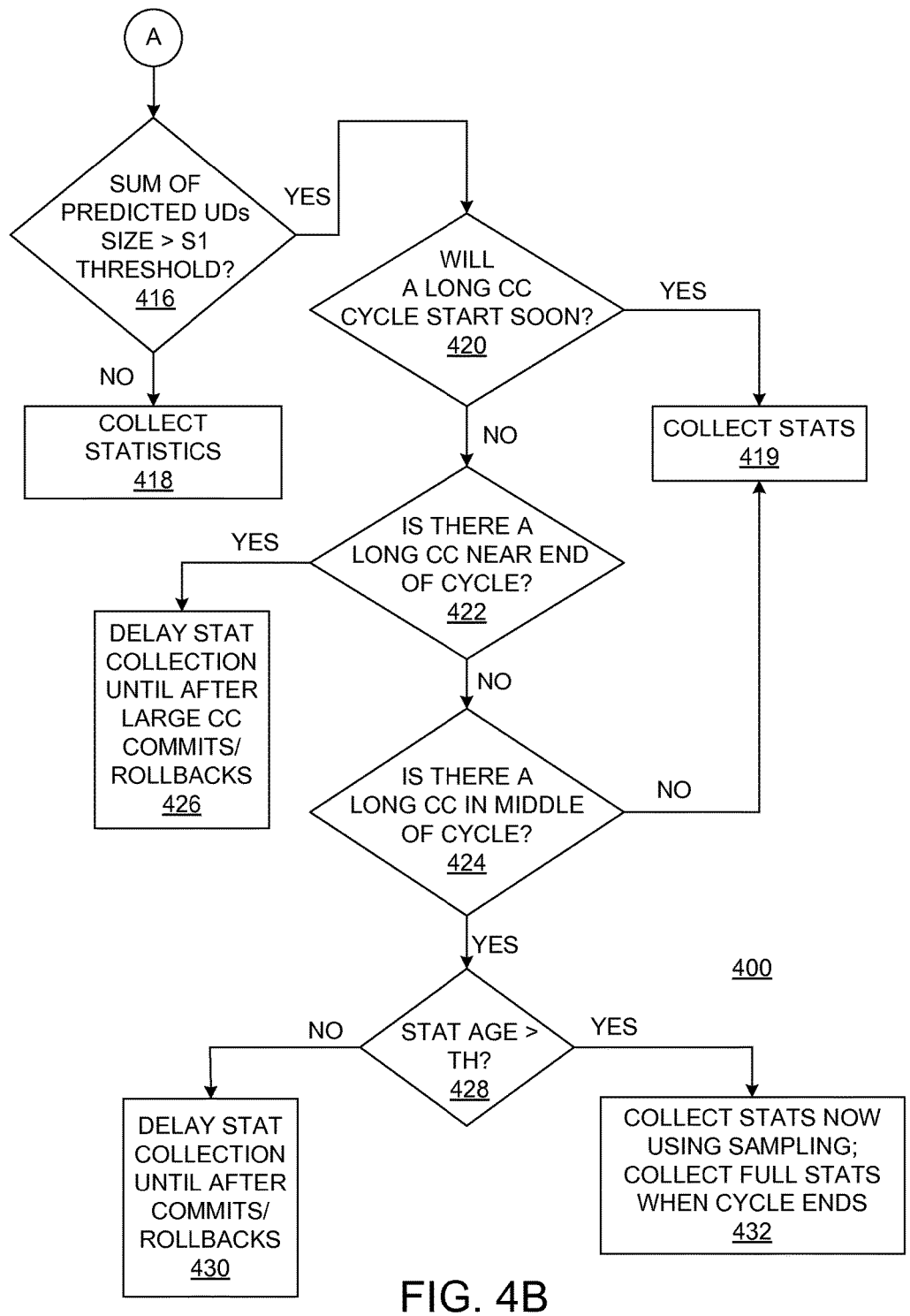

FIGS. 4A and 4B depict a flowchart of process 400 for dynamically determining a statistics collection time for a database table according to various embodiments. In operation 402, a determination is made as to whether a set of statistics for a table are stale. Statistics may be determined to be stale using any method now known or hereafter devised. For example, committed or pending updates, or both committed and pending updates may be tracked. When the number of updates tracked is greater than a threshold number of updates, statistics for the table may be determined to be stale. As another example, when a particular amount of time has elapsed, the statistics for the table may be determined to be stale. When it is determined that a set of statistics are stale, i.e., not current, the process 400 advances to operation 404.

In a first iteration of operations 404-412, a signature of a largest pending commit cycle is fetched or read from the commit cycle queue 217 in operation 404. In operation 406, it is determined whether this commit cycle is estimated to include a number of updates that is larger than a threshold number of updates (a second size threshold "S2"). In an alternative embodiment, a signature may include a score (as described above) and it is determined in operation 406 whether the score for the commit cycle is larger than an S2 threshold score. If the estimated number or updates (or score) is larger than the second size threshold, the process may move to optional operation 408 or operation 410 if operation 408 is omitted.

In optional operation 408, it may be determined whether a prediction or estimate of likelihood of a roll back of the commit cycle is greater than a confidence threshold. For example, if a particular commit cycle has been rolled back 50 percent of the time in its previous executions and the confidence threshold is 20 percent, it may be determined in operation 408 that a roll back is somewhat likely and process 400 advances operation 410. As a second example, if the particular commit cycle has been rolled back 10 percent of the time in its previous executions and the confidence threshold is 15 percent, it may be determined in operation 408 that a roll back is not somewhat likely and process 400 returns to operation 404. Optional operation 408 may be included in process 400 to exclude commit cycles that are unlikely to be rolled back from a determination of whether a statistics collection time should be scheduled immediately or later.

A sum of predicted updates in the commit cycles currently in the commit cycle queue 217 is estimated and updated in operation 410. For example, if a largest commit cycle is estimated to include 100,000 updates, a second largest commit cycle is estimated to include 50,000 updates, and a third largest commit cycle is estimated to include 25,000 updates, then, after three iterations of operations 404-412, the sum of predicted updates would be 175,000 updates after three iterations of operations 404-412 (ignoring optional operation 408).

In operation 412, it is determined whether the commit cycle in the current iteration is the last commit cycle in the commit cycle queue 217. If there are additional commit cycles in the commit cycle queue 217, the process 400 returns to operation 404 where the next largest commit cycle is fetched. Otherwise, the process 400 advances to operation 416 if all commit cycles in the commit cycle queue 217 have been processed.

Operation 414 is reached when the operation 406 determines that the commit cycle in the current iteration includes a predicted number of updates that is less than or equal to the S2 threshold number of updates or score (second size threshold). Recall the example in which the commit cycle queue 217 holds 100 commit cycles and the largest commit cycle is estimated to have one million updates while the remaining 99 commit cycles are estimated to each hold 10 updates. Assume the second size threshold is 100 updates. In a first iteration of operations 404-412, the largest commit cycle would be processed and used to update the sum of predicted updates. In a second iteration, a first one of the remaining 99 commit cycles would be determined to be below the second size threshold. In operation 414, in one embodiment, the number of commit cycles in the commit queue 217 is determined and this number may be multiplied by an average small commit cycle size. Continuing the example, if the average small commit cycle size is 10, an estimate of the number of predicted updates for commit cycles below the second size threshold is determined to be 990. The estimate of 990 predicted updates would be added to the sum of predicted updates in operation 414.

In operation 416, it is determined whether the sum of predicted updates is larger than a first size threshold ("S1"). If the sum of pending updates is less than or equal to the first size threshold, collection of statistics need not be delayed and may begin immediately, as indicated by operation 418. On the other hand, if the sum of predicted updates is greater than the first size threshold, the statistics are in need of updating and subsequent operations may be employed to determine a time for updating the set of statistics. Operation 416 may refine operation 402, serve as a double check on operation 402, or be employed in lieu of operation 402.

In various embodiments, a progress point for a commit cycle is determined. The operations 420, 422, and 424 described below may employed to determine a progress point for a first one of the commit cycles, according to an embodiment. The operations 420, 422, and 424 may be performed for each commit cycle in the commit cycle queue 217 in some embodiments. However, in other embodiments, the operations 420, 422, and 424 may be performed for a single commit cycle in the commit cycle queue 217 or for commit cycles that include a predicted number of updates above a size threshold, e.g., above the second size threshold. In various embodiments, one or more of the operations 420, 422, and 424 may be combined, omitted, or supplemented by an additional operation in a process for determining a progress point for a commit cycle.

In operation 420, it is determined whether a commit cycle that is estimated to take a relatively long time will start soon. A commit cycle may be estimated to take a relatively long time because, based on its signature, it is estimated to include a large number of updates. A size threshold number of updates may be used to estimate whether a commit cycle will take a relatively long time. In addition, available resources and the number of other jobs competing for those resources may be considered in operation 420. If there is a commit cycle that is estimated to take a relatively long period of time that has not yet started, the process 400 may advance to operation 419 where statistics are immediately collected before this commit cycle begins. In some embodiments, statistics collection may not be scheduled to begin immediately, but may be scheduled to begin in the near future. Accordingly, if a commit cycle is predicted to have a large number of updates and it is determined in operation 420 to have not yet started, a statistics collection time can be moved forward to an immediate time, even if the statistics collection time is scheduled for a later time. Otherwise, the process 400 moves to operation 422.

In operation 422, it is determined: (a) whether there is commit cycle that is currently executing; (b) whether this currently executing commit cycle is predicted to include a large number of updates; and (c) whether this commit cycle is predicted to be near completion. For example, the signature of a currently executing commit cycle indicates it averages 50,000 updates. Database logs indicate that the currently executing commit cycle has 46,000 pending updates. In this example, it may be predicted that the currently executing commit cycle is near completion. The prediction may be made based on whether a percent complete is greater than an upper threshold, e.g., 90 percent. For this example, the process 400 advances to operation 426. In operation 426, statistics collection is delayed until the currently executing commit cycle finishes and either commits or rolls back its pending updates. Otherwise, the process 400 moves to operation 424.

In operation 424, it may be determined whether there is a currently executing commit cycle that is in the "middle" of its life cycle. In other words, the currently executing commit cycle is determined to not have just started and also to not be near the end of its life cycle. A percent complete may be compared to a lower threshold to determine whether a commit cycle has just started. For example, if a percent complete is greater than a lower threshold, e.g., 10 percent, it may be determined that the currently executing commit cycle has not just started. Similarly, a percent complete may be compared to the upper threshold (referred to above) to determine whether a commit cycle is near completion. For example, if a percent complete is less than the upper threshold, e.g., 90 percent, it may be determined that the currently executing commit cycle is not near completion. If a currently executing commit cycle is determined to not have just started and also to not be near the end of its life cycle, then it may be inferred that the commit cycle is in the middle of its life cycle, and the process 400 advances to operation 428. On the other hand, if it is determined that the currently executing commit cycle is not in the middle of its life cycle, the process 400 advances to operation 419 where statistics may be immediately collected.

In operation 428, it is determined whether the age of a current set of statistics is greater than a staleness threshold. If the age of the current set of statistics is greater than the staleness threshold, then in operation 432, statistics may be immediately collected using sampling. Staleness refers to how many changes have been made since the last time statistics were collected. In some embodiments, a measure of staleness and the staleness threshold may be represented as a percentage. Collecting statistics can require scanning and sorting all of the data in a table. Collecting statistics via sampling can use fewer resources and be faster because it does not require reading all of the data in a table. Once the currently executing commit cycle that is in the middle of its life cycle finishes, statistics can be collected in the typical manner reading all of the data in the table. The statistics collected based on sampling are only used for a short time until the currently executing commit cycle finishes. If the age of the current statistics is less than or equal to the staleness threshold, then in operation 430, statistics collection may be delayed until the currently executing commit cycle finishes. In other words, the current statistics may be stale but may be deemed not so stale that updating the statistics can wait until the currently executing commit cycle finishes.

Referring again to FIG. 2, the database management system 211 includes a statistics collection component (statistics collector) 215. Logic in the statistics collection component may be configured to perform processes 300 and 400. This logic may take the form of software components, hardware components, or both software components and hardware components.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A computing device for determining a more accurate statistics collection time for a database table, comprising:
   a memory to store a database and a database management system, the database management system having a statistics collection component, the statistics collection component including a data structure to store data associated with one or more commit cycles;
   a processor to cause the statistics collection component to perform operations comprising:
      estimating a sum of predicted updates included in one or more commit cycles, wherein each of the commit cycles is associated with a predicted number of updates, wherein the estimating the sum of predicted updates occurs before the end of the first phase of a given commit cycle of the one or more commit cycles;
      determining whether the estimated sum of predicted updates is greater than a first threshold, wherein the determination is based on tracking the progress of uncommitted updates occurring in the first phase of the given commit cycle;
      determining a progress point for a first one of the commit cycles; and
      selecting a time to collect statistics based on the progress point of the first commit cycle, wherein the selected time to collect statistics provides increased accuracy by selecting a time that reflects the number of updates of uncommitted records being greater than the predicted number of updates.

2. The computing device of claim 1, the processor further causing the statistics collection component to determine:
   whether the first commit cycle includes a predicted number of updates that is greater than a second threshold, wherein the determining of a progress point for the first commit cycle is performed in response to determining that the first commit cycle includes a predicted number of updates that is greater than the second threshold.

3. The computing device of claim 1, wherein the determining of a progress point for the first commit cycle includes determining whether the first commit cycle has not yet begun, and wherein the selecting a time to collect statistics is also in response to determining that the first commit cycle has not yet begun, and wherein the selecting a time to collect more accurate statistics includes selecting the current time.

4. The computing device of claim 1, wherein the determining of a progress point for the first commit cycle includes:
   determining that the first commit cycle has completed more updates than a lower threshold of pending updates,
   determining that the first commit cycle has completed fewer updates than an upper threshold of pending updates,
   in response to determining that the first commit cycle has completed more updates than a lower threshold of pending updates and determining that the first commit cycle has completed fewer updates than an upper threshold of pending updates, determining whether an age of a current set of statistics is less than or equal to an staleness threshold, and
   selecting a future time as a time to collect statistics in response to determining that the age of the current set of statistics is less than or equal to the staleness threshold.

5. The computing device of claim 1, wherein the determining of a progress point for the first commit cycle includes:

determining that the first commit cycle has completed more updates than a lower threshold of pending updates, determining that the first commit cycle has completed fewer updates than an upper threshold of pending updates, in response to determining that the first commit cycle has completed more updates than a lower threshold of pending updates and determining that the first commit cycle has completed fewer updates than an upper threshold of pending updates, determining whether an age of a current set of statistics is greater than an staleness threshold; and selecting a current time as a time to collect statistics using sampling in response to determining that the age of the current set of statistics is greater than the staleness threshold.

6. The computing device of claim 1, wherein the determining of a progress point for the first commit cycle includes:

determining that the first commit cycle has completed more than an upper threshold of pending updates, and selecting a future time as a time to collect statistics, wherein the future time is a time when the first commit cycle has completed.

7. The computing device of claim 1, wherein the estimating of a sum of predicted updates included in one or more commit cycles includes:

monitoring the one or more commit cycles to determine whether a number of updates for a first commit cycle diverges from a predicted number updates for the first commit cycle, and revising a sum of predicted updates associated with the one or more commit cycles in response to determining that the first commit cycle diverges from the predicted number of updates for the first commit cycle.

8. The computing device of claim 1, wherein the determining a progress point for a first one of the commit cycles further comprises:

determining a respective progress point for each a plurality of the one or more commit cycles, and sorting the plurality of commit cycles into a first order according to a predicted number of updates for each commit cycle, wherein the determining of a respective progress point for each of the plurality of commit cycles are made according to the first order.

9. A computer program product for determining a statistics collection time for a database table, the computer program product comprising a computer-readable storage medium having program instructions embodied therewith, the program instructions executable by a processor to cause the processor to:

estimate a sum of predicted updates included in one or more commit cycles, wherein each of the commit cycles is associated with a predicted number of updates, wherein the sum of predicted updates includes a probability that one or more commit cycles will be rolled back, and wherein the estimating the sum of predicted updates occurs before the end of phase one of the one or more commit cycles;

determine whether the estimated sum of predicted updates is greater than a first threshold, and wherein the determining further includes a rollback threshold related to the probability that one or more commit cycles will be rolled back;

determine a progress point for a first one of the commit cycles; and select a time to collect statistics based on the progress point of the first commit cycle, wherein the accuracy of the collected statistics is increased from collecting records from the database that were affected due to the probability that the commit cycle was rolled back in phase two of the commit cycle being greater than the rollback threshold.

10. The computer program product of claim 9, wherein the determining of a progress point for the first commit cycle includes:

determining whether the first commit cycle has not yet begun, and selecting a current time as a time to collect statistics in response to determining that the first commit cycle has not yet begun.

11. The computer program product of claim 9, wherein the determining of a progress point for the first commit cycle includes:

determining that the first commit cycle has completed more than an upper threshold of pending updates, and selecting a future time as a time to collect statistics, wherein the future time is a time when the first commit cycle has completed.

12. The computer program product of claim 9, wherein the estimating of a sum of predicted updates included in one or more commit cycles includes:

monitoring the one or more commit cycles to determine whether a number of updates for a first commit cycle diverges from a predicted number updates for the first commit cycle, and revising a sum of predicted updates associated with the one or more commit cycles in response to determining that the first commit cycle diverges from the predicted number of updates for the first commit cycle.

13. The computer program product of claim 9, wherein the program instructions executable by the processor further cause the processor to:

perform, in response to the selected collection time, the statistics collection by accessing one or more tables of the database.

14. The computing device of claim 1, wherein the processor further performs operations comprising:

performing, in response to the selected collection time, the statistics collection by accessing one or more tables of the database.

15. The computing device of claim 1, wherein the processor further performs operations comprising:

sampling, in response to the selected collection time, one or more statistics of the database table.

16. A computing device for providing increased query performance in a database management system, the computing device comprising:

a memory to store a database containing one or more tables of records and to store a database managements system for manipulation of the tables;

a processor to perform database operations of the database management system comprising:

estimating a sum of predicted updates included in one or more commit cycles, wherein each of the commit cycles is associated with a predicted number of updates;

determining whether the estimated sum of predicted updates is greater than a first threshold;

determining a progress point for a first one of the commit cycles;

determining the age of the current set of statistics is greater than a staleness threshold;

selecting a current time to collect statistics based on the progress point of the first commit cycle; and collecting, using sampling based on the selected current time and based on the determining the age is greater than the staleness threshold, statistics of a subset of data in the database.

\* \* \* \* \*